(12) United States Patent
Wischnack et al.

(10) Patent No.: US 10,457,153 B2
(45) Date of Patent: Oct. 29, 2019

(54) CHARGING STATION SYSTEM FOR ELECTRIC VEHICLES WITH INTERCONNECTIONS BETWEEN POWER AND COOLING MAIN COMPONENTS

(71) Applicant: Dr. Ing. h.c. F. Porsche Aktiengesellschaft, Stuttgart (DE)

(72) Inventors: Thomas Wischnack, Karlsruhe (DE); Volker Reber, Michelbach an der Bilz (DE); Ralf Oestreicher, Sindelfingen (DE); Michael Kiefer, Stuttgart (DE); Steve Zander, Marbach am Neckar (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 36 days.

(21) Appl. No.: 15/922,035

(22) Filed: Mar. 15, 2018

(65) Prior Publication Data

US 2018/0264962 A1    Sep. 20, 2018

(30) Foreign Application Priority Data

Mar. 16, 2017   (DE) .......................... 10 2017 105 632

(51) Int. Cl.
*H02J 7/00*      (2006.01)
*B60L 11/18*    (2006.01)
(Continued)

(52) U.S. Cl.
CPC ........... *B60L 11/1825* (2013.01); *B60L 53/14* (2019.02); *B60L 53/22* (2019.02); *B60L 53/30* (2019.02);
(Continued)

(58) Field of Classification Search
CPC ................................................... B60L 11/1816
(Continued)

(56) References Cited

U.S. PATENT DOCUMENTS

| | | | |
|---|---|---|---|
| 4,992,669 A | 2/1991 | Parmley | |
| 5,548,200 A * | 8/1996 | Nor | B60L 53/305 |
| | | | 320/109 |

(Continued)

FOREIGN PATENT DOCUMENTS

| | | |
|---|---|---|
| CN | 105896678 A | 8/2016 |
| DE | 112012003115 T5 | 8/2014 |

(Continued)

OTHER PUBLICATIONS

German Search Report for German Application No. 10 2017 105 632.7, dated Mar. 6, 2018 with partial English translation, 8 pages.

(Continued)

*Primary Examiner* — Yalkew Fantu
(74) *Attorney, Agent, or Firm* — RatnerPrestia (57) ABSTRACT

A charging station system, in particular for electric vehicles is described, wherein the charging station system has at least one housing. The charging station system also has a plurality of main components. The housing and the main components are standardized in such a manner that the main components can be arranged modularly in the housing. An associated method for constructing a charging station is also described.

8 Claims, 5 Drawing Sheets

(51) Int. Cl.
*B60L 53/14* (2019.01)
*B60L 53/22* (2019.01)
*B60L 53/30* (2019.01)
*B60L 53/31* (2019.01)

(52) U.S. Cl.
CPC ............ *B60L 53/31* (2019.02); *H02J 7/0027* (2013.01); *Y02T 10/7005* (2013.01); *Y02T 10/7088* (2013.01); *Y02T 90/121* (2013.01); *Y02T 90/127* (2013.01); *Y02T 90/14* (2013.01)

(58) Field of Classification Search
USPC ......................................................... 320/109
See application file for complete search history.

(56) References Cited

U.S. PATENT DOCUMENTS

| | | | |
|---|---|---|---|
| 7,061,208 B2 | 6/2006 | Nishihata et al. | |
| 7,619,319 B1 | 11/2009 | Hunter | |
| 9,786,961 B2 | 10/2017 | Dyer et al. | |
| 2009/0067205 A1* | 3/2009 | Oyobe ................... | B60K 6/445 363/98 |
| 2009/0108552 A1 | 4/2009 | Mann, III et al. | |
| 2010/0060093 A1 | 3/2010 | Hunter | |
| 2010/0274697 A1* | 10/2010 | Zyren ................... | G06Q 30/04 705/34 |
| 2013/0069592 A1* | 3/2013 | Bouman ................... | H02J 7/00 320/109 |
| 2014/0167697 A1* | 6/2014 | Stempin .............. | B60L 11/1824 320/109 |
| 2014/0210214 A1 | 7/2014 | Campion et al. | |
| 2015/0258902 A1 | 9/2015 | Fietzek et al. | |
| 2016/0121735 A1 | 5/2016 | Sugano | |
| 2016/0369689 A1 | 12/2016 | Brewer et al. | |
| 2017/0033338 A1 | 2/2017 | O'Hora | |
| 2017/0110895 A1* | 4/2017 | Low ...................... | H02J 7/0021 |
| 2018/0212438 A1 | 7/2018 | Bouman | |

FOREIGN PATENT DOCUMENTS

| | | |
|---|---|---|
| EP | 2497678A2 A2 | 9/2012 |
| EP | 2551987 A1 | 1/2013 |
| EP | 2651002 A1 | 10/2013 |
| EP | 3035478 A1 | 6/2016 |
| JP | 2003007356 A | 1/2003 |
| JP | 2013529052 A | 7/2013 |
| JP | 2016063690 A | 4/2016 |

OTHER PUBLICATIONS

EIE/ECA Standard, EIA/ECA-310-E, Electronic Components, Assemblies & Materials Association, Cabinets, Racks, Panels, and Associated Equipment, Dec. 2005. 25 pages.
German Electro-technical Commission—Technical Standard Committee for Electro-technology in the DNA together with the VDE Regulations Committee, Mechanical Structure for Electronic Devices, Revision, Sep. 1974, DN 41 494 revised to DIN 41 494 sheet 1, 4 pages.
European Standard DIN EN 13698-1, Pallet Production Specification, Supersedes DIN 15146-2, Nov. 1986 Edition, 26 pages.
IEC 60297-3-105, Inernational Standard, Mechanical structures for elecrtonic equipment, Edition 1.0, Nov. 2008, 38 pages.
Notification of Reason for Rejection of Japanese Application No. 2018-047677, dated Nov. 27, 2018, 5 pages.
Setec-Power.com: "Solar EV charging station used EV fast charger with CHAdeM0 and SAE combo connector, View CHAdeM0 EV charging station, SETEC Product Details from Shenzhen Setec Power Co., Ltd. On Alibaba.com", Aug. 14, 2015, XP055487382, Gefunden im Internet: URL:https://inverter.en.alibaba.com/product/60438630382-801471302/Solar_EV_charging_station_used_EV_fast_charger_with_C HAdeMO_and SAE_combo_connector.html [gefunden am Jun. 25, 2018] 6 pgs.
Setec-Power.com: "Manufacturing Dc Fast EV Charging Modules for Nissan—Buy Charging Module For Electric Car, High Quality Car Battery Charger Module, High Speed EV Charge Station Product on Alibaba.com", Dec. 25, 2015, XP055487377, Gefunden im Internet: URL:https://www.alibaba.com/prodcut-detail/manufacturing-DC-FAST-EV-charging-modules 60443044900.html [gefunden am Jun. 25, 2018] 5 pgs.
Peter Moosbrugger: "PowerBatch Mehrbehalter", Dec. 30, 2008, XP055487607 URL:http://www.klaeranlagen-moosbrugger.de/html/powerbatch_mehrbehalter.html [gefunden am Jun. 25, 2018], 2 pgs.
European Search Report for European Application No. 18020024.8, dated Nov. 23, 2018 with partial translation, 8 pages.

* cited by examiner

CHARGING STATION SYSTEM FOR ELECTRIC VEHICLES WITH INTERCONNECTIONS BETWEEN POWER AND COOLING MAIN COMPONENTS

CROSS-REFERENCE TO RELATED APPLICATION

This application claims priority to German Patent Application No. DE 10 2017 105 632.7, filed Mar. 16, 2017, which is incorporated by reference herein in its entirety.

FIELD OF THE INVENTION

The present invention relates to a charging station system, in particular for electric vehicles.

BACKGROUND OF THE INVENTION

Charging station systems for supplying electric vehicles with electrical energy are known from the prior art. Charging stations are equipped with one or more charging units. These charging units are customarily designed as a complete premanufactured unit. In a unit, devices for supplying power, for cooling, operating elements and the charging connection cable are found in a fixed arrangement, number and configuration. The charging units are constructed in this case for a fixed application and/or a certain use location. New applications and/or locations having conditions changed in relation to previous locations require the planning and construction of new charging units. With previously known charging station systems, it is not possible to flexibly take into consideration the local and current circumstances and requirements in the construction of a charging station.

SUMMARY OF THE INVENTION

It is the object of the present invention to provide a charging station system and a corresponding method for constructing such a charging station, which makes it possible to flexibly react to local and current requirements and circumstances in the construction of a charging station.

This object is achieved by a charging station system, in particular for electric vehicles, wherein the charging station system has at least one housing, wherein the charging station system has a plurality of main components, wherein the housing and the main components are standardized in such a manner that the main components can be arranged modularly in the housing.

It is thereby advantageously possible to flexibly react to location requirements in the construction of a charging station. In particular, the electrical power and the cooling power of the charging station can be selected independently of each other. The electrical power of the charging station can be changed, for example, without the cooling power being changed. Conversely, the cooling power of the charging station can also be changed without the electrical efficiency of the charging station being changed. A charging station system is thereby advantageously provided which permits calibration of the electrical power of a charging station independently of the cooling power of the charging station. A charging station system is thereby advantageously provided which permits calibration of the cooling power of a charging station independently of the electrical power of the charging station.

In a preferred embodiment of the present invention, the main components and the housing have a mutually coordinated standardization in terms of their dimensions, wherein in particular the housing has internal dimensions which are determined by the external dimensions of the main components.

In a preferred embodiment of the present invention, the housing has internal dimensions which permit an arrangement of a plurality of main components in the housing with optimum use of the volume of the housing. In particular, the housing has internal dimensions which are composed of an integral multiple of the external dimensions of a main component and of a distance to be maintained between housing and main component. In a preferred embodiment of the present invention, the housing has a square area. In a further preferred embodiment, the external dimensions of the area of the housing are selected in such a manner that the housing can be positioned with the bottom side on one or more Euro pallets without protruding. A Euro pallet within the context of this invention refers to a reusable transport pallet standardized in accordance with EN 13698-1. In a preferred embodiment of the present invention, the area of the housing has outer edges of a maximum length of 1200 mm. In an alternative preferred embodiment, the area of the housing has outer edges of a maximum length of an integral multiple of 1200 mm.

In a further preferred embodiment of the present invention, the charging station system has a plurality of main components, wherein each of said main components has a control box, wherein the main component has at least one module, wherein the architecture of the module is wherein the module can be arranged modularly in the control box.

In a preferred embodiment of the present invention, the control box is designed as a 19-inch rack. Within the context of the present invention, a 19 inch rack refers to a framework, which is standardized in accordance with EIA 310-D, IEC 60297 and DIN 41494 SC48D, for accommodating electronic devices, wherein the framework has a standardized width of 19 inches, i.e. 482.6 mm, and the framework furthermore has holding devices for the electronic devices, said holding devices being fitted vertically at a standardized distance from a height unit, wherein a height unit corresponds to 1.75 inches, i.e. 44.45 mm.

In a preferred embodiment of the present invention, the external dimensions of the modules are selected in such a manner that an arrangement in a 19-inch rack is possible.

A main component which can be designed modularly is thereby advantageously provided. It is thereby advantageously possible to construct main components having different properties rapidly and simply from predetermined modules. By this means, it is advantageously possible to adapt the main component with a reduced outlay to new circumstances and requirements which arise, for example, from the location and/or changes in the technical requirements and/or changes in consumer behavior.

In a preferred embodiment of the present invention, the charging station system has at least one main component, wherein the main component has a plurality of modules, wherein the modules are exclusively power supply modules.

A main component which serves exclusively for supplying power is thereby advantageously provided. It is thereby advantageously possible to take into consideration the requirements and restrictions imposed on the power supply of the charging station without reference to additional and possibly contradictory requirements and restrictions of other components.

For example, the task of the power supply component is to convert the alternating current, based on the stationary power network, into direct current which is efficient for charging up the end users, for example electric vehicles. For this purpose, the power supply component is connected to the stationary power network by an alternating voltage line. The power supply component is connected for this purpose to a charging device via a direct voltage line. On account of different technical requirements, alternating voltage lines can be designed to be much longer than direct voltage lines. For example, alternating voltage lines can have a length of up to 1000 m while direct voltage lines can have a length of up to 100 m. The different technically induced maximum length of direct voltage and alternating current lines constitutes a particular requirement imposed on the power supply component that can advantageously be taken into account because of the modular construction of the charging station system without reference to the requirements imposed on the remaining components of the charging station.

In a preferred embodiment of the present invention, the main component has precisely one power supply module. In an alternative preferred embodiment, the main component has at least two power supply modules.

In a preferred embodiment of the present invention, the charging station system has a first type of power supply module and at least one second type of power supply module, wherein the first and the second type of power supply module differ in at least one property. In a preferred embodiment of the present invention, the first type of power supply module has a first architecture, and the second type of power supply module has a second architecture which is different from the first architecture. Architecture within the context of the present invention refers here to the manner and arrangement of the electric components of which the power supply module is composed.

Within the context of the present invention, components are, for example but not exclusively units of any design for converting alternating current into direct current (AC/DC units) and units of any design for converting direct current into direct current (DC/DC units).

In a preferred embodiment of the present invention, the charging station system has at least one main component, wherein the main component has a plurality of modules, wherein the main component has at least one power supply module and a cooling module.

A main component which combines cooling and supply of power is thereby advantageously provided. A main component which has at least one cooling module and at least one power supply module is referred to below as a power supply/cooling combination component.

In a preferred embodiment of the present invention, the charging station system has at least one main component, wherein the main component has a plurality of modules, wherein the modules are exclusively cooling modules.

A main component is thereby advantageously provided by itself for cooling purposes. It is thereby advantageously possible to take into consideration the requirements and restrictions imposed on the cooling of the charging station without reference to additional and possibly contradictory requirements and restrictions of other components.

In a preferred embodiment of the present invention, the main component has precisely one cooling module. In an alternative preferred embodiment, the main component has at least two cooling modules.

In a preferred embodiment of the present invention, the charging station system has a first type of cooling module and at least one second type of cooling module, wherein the first and the second type of cooling module differ in at least one property. In a preferred embodiment of the present invention, the first type of cooling module has a first cooling power and the second type of cooling module has a second cooling power which is different from the first cooling power.

In a preferred embodiment of the present invention, the charging station system has a charging pole. In a preferred embodiment of the present invention, the charging pole has operating elements for operation by a user of the charging pole.

In a preferred embodiment of the present invention, the charging station system has a transformation station.

In a preferred embodiment of the present invention, the at least one housing is manufactured from steel sheet, steel plates or concrete. A housing which can be erected in the open air and in buildings is thereby advantageously provided.

In a preferred embodiment of the present invention, the at least one housing has precisely one door. It is thereby advantageously possible, after erection of the housing fitted with main components, to replace the main components and/or to carry out repairs and/or maintenance work on the main components and the lines thereof without damaging the housing.

In a preferred embodiment of the present invention, the charging station system has a first housing and at least one second housing which is situated next to or above the first housing.

A charging station system, the housings of which can be stacked next to and/or on one another, is thereby advantageously provided. It is thereby advantageously possible to increase the interior space present for accommodating the main components.

BRIEF DESCRIPTION OF THE DRAWINGS

Further details, features and advantages of the invention emerge from the drawings and from the description below of preferred embodiments with reference to the drawings. The drawings here merely illustrate exemplary embodiments of the invention that do not restrict the inventive concept.

DETAILED DESCRIPTION OF THE INVENTION

Figure 1:
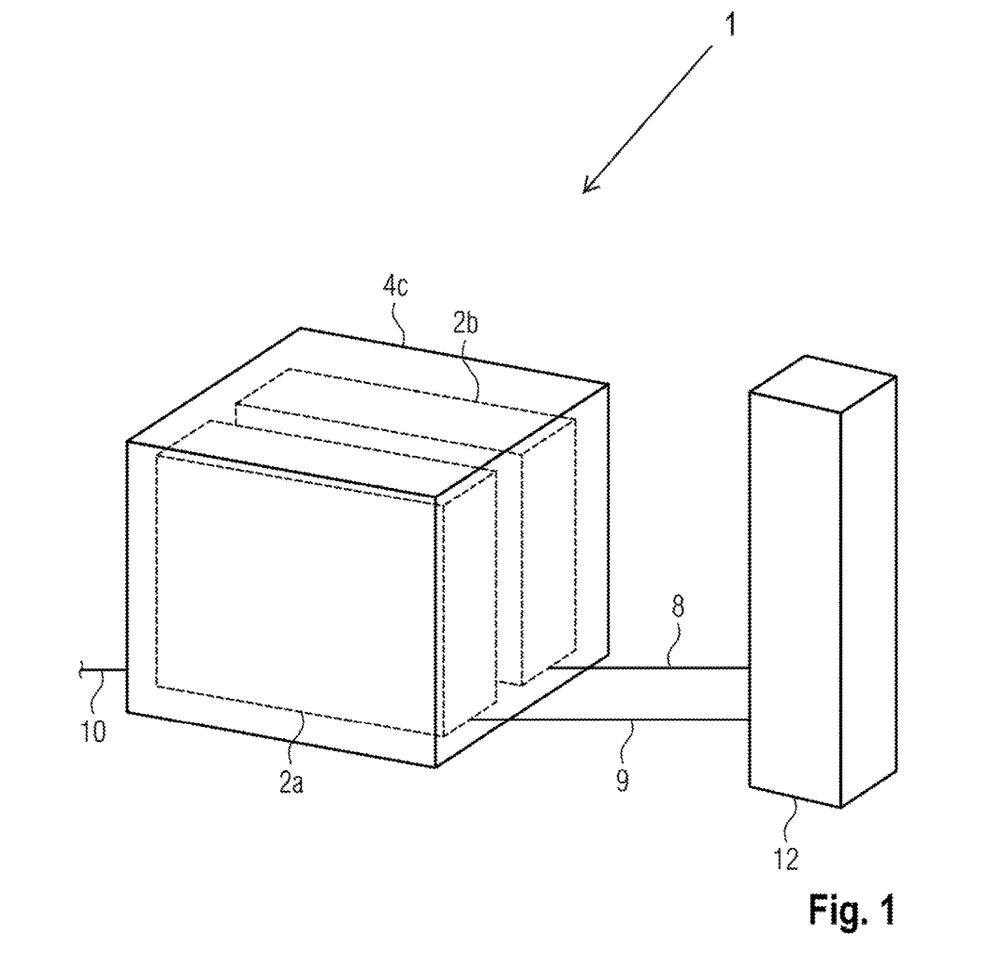
FIG. 1 schematically illustrates the construction of a charging station with a charging pole and a power supply/cooling combination component.

FIG. 1 schematically illustrates a charging station 1 with a power supply/cooling combination component 4c and a charging pole 12 according to the present invention.

In a preferred embodiment of the present invention, the main component 4c is equipped with a power supply module 2a and a cooling module 2b. The main component 4c has a first input for an alternating current source and an alternating current line 10. The main component 4c furthermore has a first output for the coolant line 8 and a second output for the direct current. The charging station furthermore has a charging pole 12 which is connected to the main component 4c by means of the coolant line 8 and direct current line 9. A charging station with a charging pole is thereby advantageously provided. The cooling is advantageously installed directly in a component with the power supply module.

Figure 2:
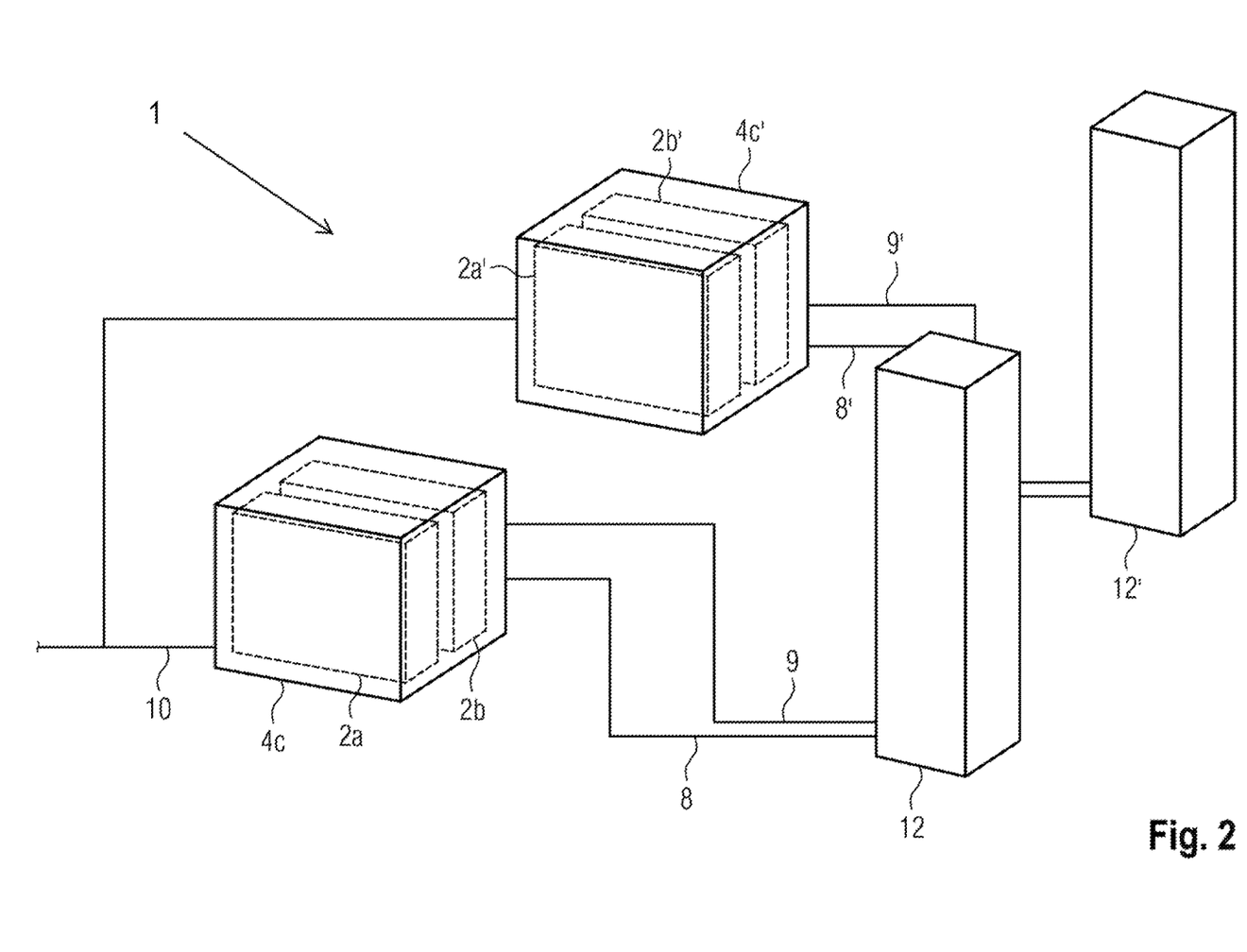
FIG. 2 schematically illustrates the construction of a charging station with two charging poles and two power supply/cooling combination components.

FIG. 2 schematically illustrates a charging station 1 with two power supply/cooling combination components 4c and 4c' and two charging poles 12 and 12' according to the present invention.

In an alternative preferred embodiment of the present invention, a first main component 4c and a second main component 4c' which is identical thereto are provided, wherein the first and the second main component 4c and 4c' each have a power supply module 2a and 2a' and each have a cooling module 2b and 2b'. The first and the second main component 4c and 4c' each have an input for the same alternating current source and a first output for a coolant line 8 and 8' and a second output for direct current. The charging station 1 furthermore has a first charging pole 12 which is connected to the first main component 4c by means of the coolant line 8 and direct current line 9. The charging station 1 furthermore has a second charging pole 12' which is connected to the second main component 4c' by means of the coolant line 8' and direct current line 9'. A charging station 1 with two charging poles 12 and 12' which are both fed from the same alternating current source is thereby advantageously provided. It is thereby advantageously possible, for example, to charge up to two electric vehicles with electrical energy simultaneously.

Figure 3:
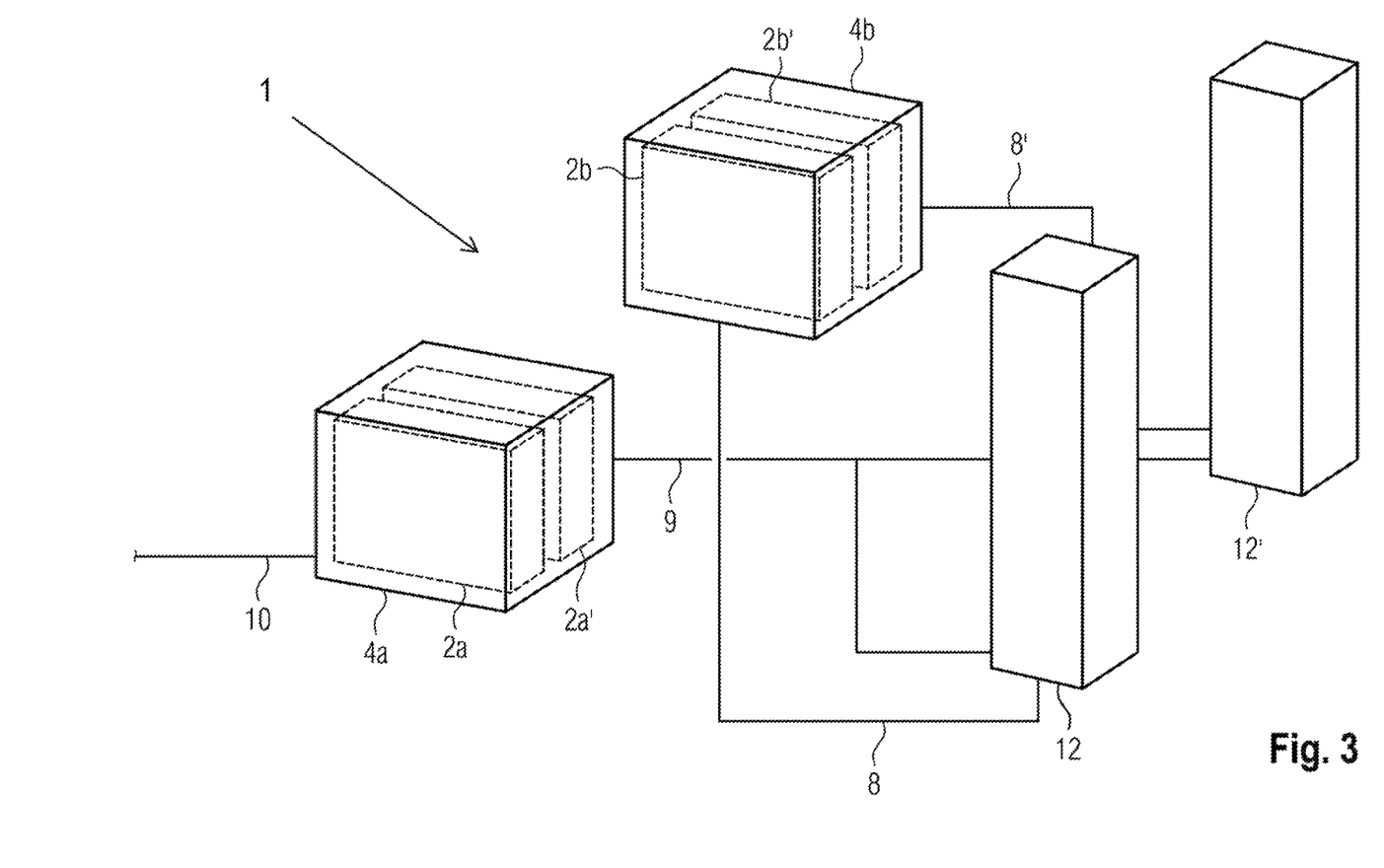
FIG. 3 schematically illustrates the construction of a charging station with two charging poles and a power supply component and a cooling component.

FIG. 3 schematically illustrates a charging station 1 with a power supply component 4a and a cooling component 4b and two charging poles 12 and 12' according to the present invention.

In an alternative preferred embodiment of the present invention, a first main component 4a and a second main component 4b are provided. The first main component 4a has two power supply modules 2a and 2a' which are fed with alternating current via an input for an alternating current source. The first main component 4a furthermore has an output for direct current. The second main component 4b has two cooling modules 2b and 2b' and a first and a second output for a first and a second coolant line 8 and 8'. The charging station furthermore has a first and a second charging pole 12 and 12', wherein the first charging pole 12 is connected to the first output of the cooling components 4b by means of the first coolant line 8, and the second charging pole 12' is connected to the second output of the cooling component 4b by means of the second coolant line 8'. Only the charging poles 12 and 12' are cooled by the cooling component 4b. The power supply component 4a is not cooled by the cooling component 4b. The first main component 4a supplies the first and the second charging pole 12 and 12' with direct current by means of a direct current line 9 which is connected to the first output of the main component 4a and branches into two lines. A charging station 1 with two charging poles 12 and 12' is thereby advantageously provided, wherein the cooling can be positioned independently of the power supply. It is thereby advantageously possible to take local circumstances and limitations into consideration in the construction of the charging station 1.

Figure 4:
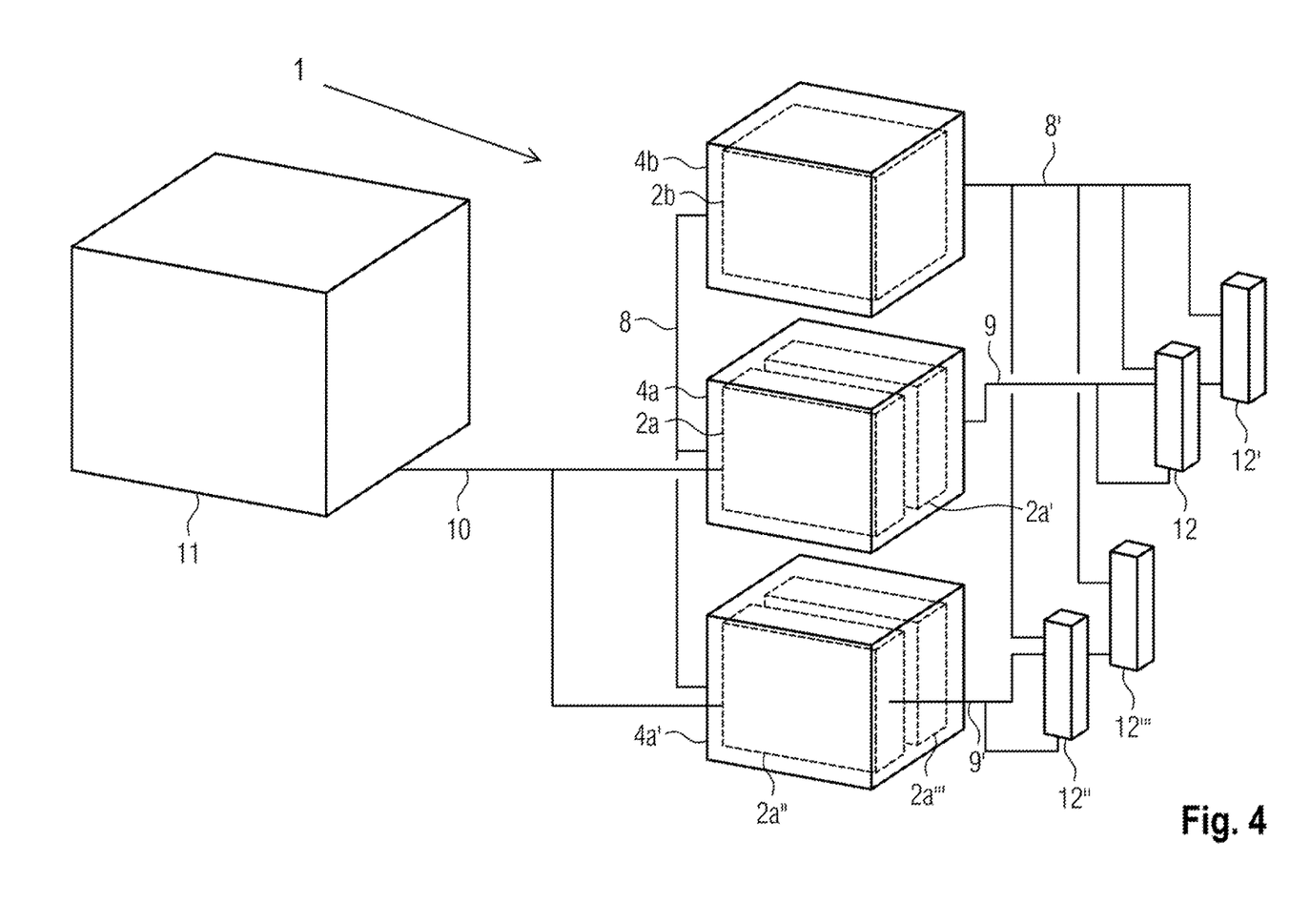
FIG. 4 schematically illustrates the construction of a charging station with four charging poles and two power supply components and a cooling component, and also a transformation station.

FIG. 4 schematically illustrates a charging station 1 with two power supply components 4a and 4a', a cooling component 4b and four charging poles 12, 12', 12" and 12'" according to the present invention.

In a further alternative embodiment of the present invention, a first, a second and a third main component 4b, 4a and 4a' are provided. The first main component 4b here has two cooling modules 2b and 2b' with a first and a second output for a first and a second coolant line 8 and 8'. The second and the third main component 4a and 4a' each have two power supply modules 2a, 2a' and 2a", 2a'" each having an input for alternating current and each having an output for direct current. The second and the third main component 4a and 4a' each have an input for a coolant line 8 by means of which they are connected to the first output of the cooling component 4b. The charging station 1 furthermore has four charging poles 12, 12', 12" and 12'" which are connected to the cooling component 4b via the second output of the cooling component 4b with a coolant line 8' having four branches. The cooling component 4b cools the power supply components 4a and 4a' and the four charging poles 12, 12', 12" and 12'". The first power supply component 4a is connected to the first and the second charging pole 12 and 12' at the direct current output of the first power supply component 4a via a branching direct current line 9. The second power supply component 4a' is connected to the third and the fourth charging pole 12" and 12'" at the direct current output of the first power supply component 4a' via a branching direct current line 9'. The charging station 1 furthermore has a transformation station 11. The latter supplies the first and the second power supply component 4a and 4a' with alternating current via a branching alternating current line 10 to the alternating current inputs of the respective main component.

A charging station 1 with four charging poles 12, 12', 12" and 12'", at which, for example, up to four electric vehicles can be charged up simultaneously, is thereby advantageously provided. The cooling and supply of power are advantageously realized in different main components. While the positioning of the power supply components depends on the location of the transformation station, the positioning of the cooling is not subject to any such limitation. The modular construction of the charging station also makes it possible here to enter flexibly into the local circumstances and requirements.

Figure 5:
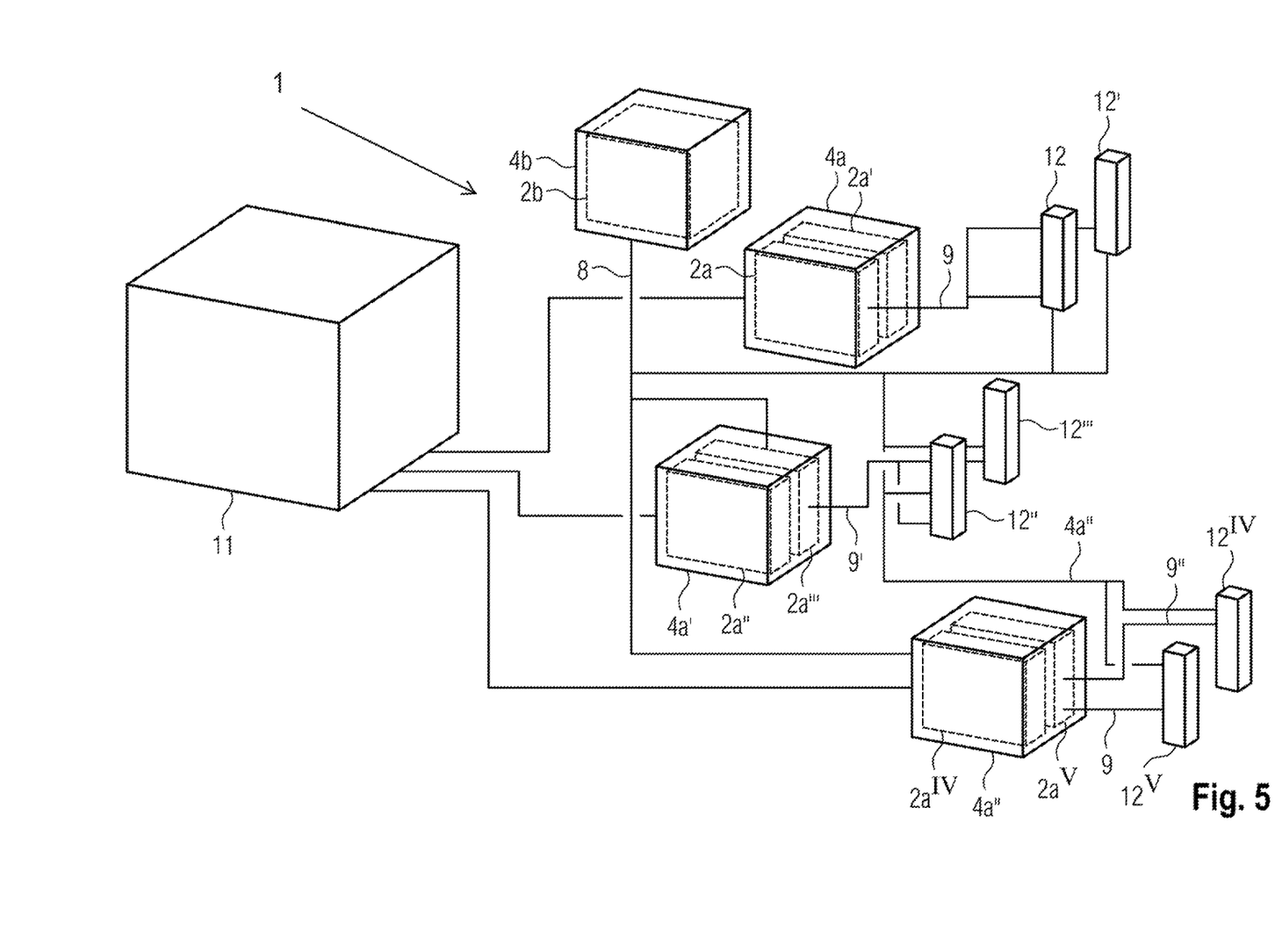
FIG. 5 schematically illustrates the construction of a charging station with six charging poles and three power supply components and a cooling component, and also a transformation station.

FIG. 5 schematically illustrates a charging station 1 with three power supply components 4a, 4a' and 4a", a cooling component 4b and six charging poles 12, 12', 12", 12'", $12^{IV}$ and $12^V$ according to the present invention.

In a further preferred embodiment of the present invention, the charging station 1 has six charging poles 12, 12', 12", 12'", $12^{IV}$ and $12^V$. The charging station 1 furthermore has a first cooling component 4b which has a cooling module 2b and an output for a coolant line 8. The charging station 1 furthermore has a first and a second power supply component 4a and 4a', wherein the first and the second power supply components 4a and 4a' each have two power supply modules 2a, 2a' and 2a", 2a'" and each have an input for alternating current and an output for direct current. The charging station 1 furthermore has a third power supply component 4a" which has two power supply modules $2a^{IV}$, $12a^V$ and an alternating current input and a first and a second direct current output, and also each have an input for one coolant line in each case. The charging station 1 furthermore has a transformation station 11 which is connected via a respective alternating current line 10, 10' and 10" in each case to the alternating current input of the first, second and third power supply component 4a, 4a' and 4a". The cooling component 4b cools the second and third power component 4a' and 4a" and also the six charging poles 12, 12', 12", 12''', 12$^{IV}$ and 12$^V$ via branching coolant lines 8 connected to the output of the cooling component 4b. The first and second charging pole 12 and 12' are supplied with direct current via a direct current line 9 branching from the direct current output of the first power component 4a. The third and fourth charging pole 12" and 12''' are supplied with direct current via a direct current line 9' branching from the direct current output of the second power component 4a'. The fifth charging pole 12$^{IV}$ is supplied with direct current from the first direct current output of the third power supply component 4a" by means of the direct current line 9". The sixth charging pole 12$^V$ is supplied with direct current from the second direct current output of the third power supply component 4a" by means of the direct current line 9".

A charging station 1 with six charging poles 12, 12', 12", 12''', 12$^{IV}$ and 12$^V$ for simultaneously charging up, for example, up to six electric vehicles is thereby advantageously provided.

LIST OF REFERENCE SIGNS

1 Charging station
2a Power supply module
2b Cooling module
4a Power supply component
4b Cooling component
4c Power supply/cooling combination component
7 Housing
8 Coolant line
9 direct current line
10 Alternating current line
11 Transformation station
12 Charging pole

What is claimed is:

1. A charging station system comprising:
   at least one housing;
   a plurality of main components located inside the at least one housing and including:
      a first main component having a first power supply module to output a first direct current line branch and a second power supply module to output a second direct current line branch, wherein the first main component and the second main component are configured to be connected to a transformation station to receive an alternating current input;
      a second main component having:
         a first cooling module that includes a first coolant line with a first cooling power, and
         a second cooling module that includes a second coolant line with a second cooling power that is same or different from the first cooling power;
   a first charging pole connected to the first cooling module of the second main component by the first coolant line; and
   a second charging pole connected to the second cooling module of the second main component by the second coolant line;

wherein:
   each one of the first cooling module and the second cooling module is configured to cool a maximum of three power supply modules together with three charging poles,
   the first charging pole is connected to the first power supply module of the first main component by the first direct current line branch, and
   the second charging pole is connected to the second power supply module of the second main component by the second direct current line branch.

2. The charging station system as claimed in claim 1, wherein each of the plurality of main components has a control box.

3. The charging station system as claimed in claim 1, wherein the charging station system includes the transformation station.

4. The charging station system as claimed in claim 1, wherein the at east one housing is manufactured from steel sheet, steel plates or concrete.

5. The charging station system as claimed in claim 1, wherein the at least one housing has at least one door.

6. The charging station system as claimed in claim 1, wherein the at least one housing includes a first housing and a second housing which is situated next to or above the first housing.

7. A charging station system comprising:
   at least one housing; and
   a plurality of main components located inside the at least one housing and including:
      a first main component having:
         a first cooling module that includes a first coolant line with a first cooling power, and
         a second cooling module that includes a second coolant line with a second cooling power that is same or different from the first cooling power;
      a second main component and a third main component configured to be connected to a transformation station to receive an alternating current input, wherein:
         each of the second main component and the third main component have a respective first power supply module to output a respective first direct current line branch and a respective second power supply module to output a respective second direct current line branch, and
         each of the second main component and the third main component are connected to the first cooling module by the first coolant line;
   a first charging pole connected to the second cooling module of the first main component by the second coolant line and connected to the respective first power supply module of the second main component by the respective first direct current line branch;
   a second charging pole connected to the second cooling module of the first main component by the second coolant line and connected to the respective second power supply module of the second main component by the respective second direct current line branch; and
   a third charging pole connected to the second cooling module of the first main component by the second coolant line and connected to the respective first power supply module of the third main component by the respective first direct current line branch.

8. A charging station system comprising:

at least one housing; and a plurality of main components located inside the at least one housing and including:
- a cooling component that includes first and second cooling modules having a respective cooling power same or different from each other over a respective coolant line;
- a first power component, a second power component, and a third power component configured to be connected to a transformation station to receive a respective alternating current input, wherein:
   - each of the first power component, the second power component, and the third power component have a respective first power supply module to output a respective first direct current line branch and a respective second power supply module to output a respective second direct current line branch, and
   - the respective first power supply module and the respective second power supply module of the second power component and the third power component are connected to the first cooling module and the second cooling module respectively by the respective coolant line;
- a first charging pole connected to the respective first power supply module of the first power component by the respective first direct current line branch;
- a second charging pole connected to the respective second power supply module of the first power component by the respective second direct current line branch;
- a third charging pole connected to the respective first power supply module of the second power component by the respective first direct current line branch;
- a fourth charging pole connected to the respective second power supply module of the second power component by the respective second direct current line branch;
- a fifth charging pole connected to the respective first power supply module of the third power component by the respective first direct current line branch; and
- a sixth charging pole connected to the respective second power supply module of the third power component by the respective second direct current line branch;

wherein:
- the first charging pole, the second charging pole, and the third charging pole are connected to the first cooling module by the respective coolant line,
- the fourth charging pole, the fifth charging pole, and the sixth charging pole are connected to the second cooling module by the respective coolant line, and
- each one of the first cooling module and the second cooling module is configured to cool a maximum of three power supply modules together with three charging poles.

* * * * *